March 4, 1952 R. A. ROWLEY 2,588,049

COMPARING DEVICE

Filed Oct. 28, 1950 4 Sheets-Sheet 1

Inventor
RUSSELL A. ROWLEY by Geoffrey Knight
Attorney

March 4, 1952 R. A. ROWLEY 2,588,049

COMPARING DEVICE

Filed Oct. 28, 1950 4 Sheets-Sheet 2

Inventor
RUSSELL A. ROWLEY
by Geoffrey Knight
Attorney

March 4, 1952 R. A. ROWLEY 2,588,049

COMPARING DEVICE

Filed Oct. 28, 1950 4 Sheets-Sheet 3

Inventor
RUSSELL A. ROWLEY by Geoffrey Knight
Attorney

March 4, 1952

R. A. ROWLEY 2,588,049

COMPARING DEVICE

Filed Oct. 28, 1950

4 Sheets-Sheet 4

Inventor
RUSSELL A. ROWLEY by Geoffrey Knight
Attorney

Patented Mar. 4, 1952 2,588,049

UNITED STATES PATENT OFFICE 2,588,049

COMPARING DEVICE

Russell A. Rowley, Binghamton, N. Y., assignor to International Business Machines Corporation, New York, N. Y., a corporation of New York Application October 28, 1950, Serial No. 192,749

4 Claims. (Cl. 235—61.7)

This invention relates to a comparing device characterized by large capacity.

More particularly, it pertains to a comparing device in which a large number of character groups can be set up as a comparison standard.

There are known comparison devices which afford a large number of comparison groups in one set up, but these have been characterized by limitations in flexibility, which sometimes made it necessary to use a plurality of independent set up panels for a single problem and to compare the data with the different panels in succession.

It is an object of the invention to provide a comparing means by which each item of data can be compared with a comparison set up including a large number of different character groups set up at once for concurrent comparison and which affords complete flexibility as to the different character groups that can be combined in one set up.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1*a* to 1*c* together constitute a wiring diagram of an illustrative embodiment of the invention.

The comparing device which forms the subject of this invention will be illustrated as embodied in a tape reproducer. An original tape having a sequence of items, each consisting of a set of coded numbers is thereby selectively reproduced into a blank tape, only those items identified by an indicative number which agrees with one of the numbers in the comparison setup being reproduced.

Figures 2, 3:
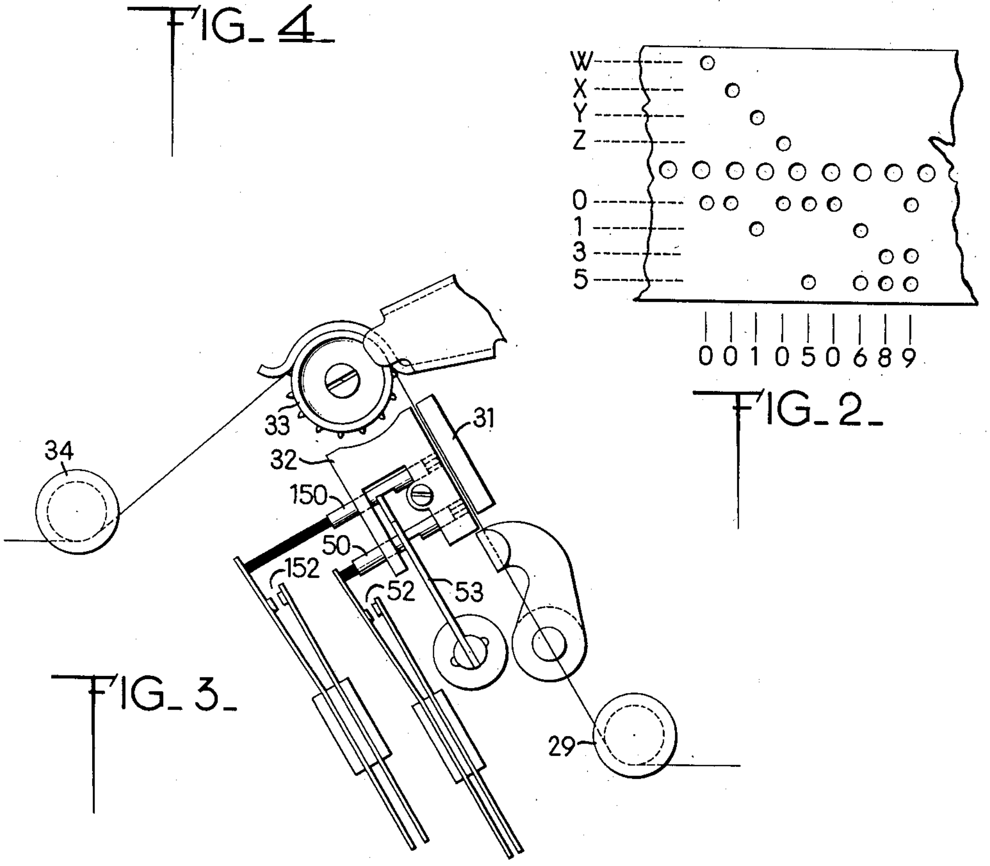
Fig. 2 is a portion of a tape showing code perforations representing numbers to be compared in the device.
Fig. 3 is a detail view of the tape sensing mechanism.

The original tape reader may be, for example, a modification of one shown in Patent No. 2,340,801. The tape sensing portion of this mechanism, as modified for the purpose of the present illustrative example, is shown in Fig. 3. The original tape is fed from a supply roll (not shown) under a guide roll 29 through a slot formed by blocks 31 and 32, over a pin wheel 33, and under a guide roll 34 to a rewind device (not shown). A row of eight sensing pins 50, only the nearest one being visible in Fig. 3, is guided in the block 32 so as to be capable of moving against the tape. The pins are respectively connected to movable arms of contacts 52, one contact for each pin, which urge the pins in the direction of the tape. At one portion of the cycle the pins are held back from the tape by a common bail 53 and during this time motion is imparted to the pin wheel 33, the pins of which engage a line of holes 25 down the middle of the tape, to advance the tape so that the next column of code perforations is brought into line with the pins 50.

The mechanism so far described is identical to that shown in Patent No. 2,340,801, except for the number of sensing pins 50 and the fact that the pin wheel shaft is moved upward, slightly, to provide room for a second set of sensing pins 150 controlling respectively contacts 152. The pins 150 are spaced behind the pins 50 for a distance equal to 5 columns of the tape. Thus, the pins 150 will sense a particular column of the tape five cycles later than the pins 50.

As will appear later in the description, the pins 50 sense the tape for comparison of the indicative information, while the pins 150 sense the tape for controlling the reproducing magnets of the re-perforator.

The re-perforator may be the same as the one shown in Patent No. 2,346,267, except that its capacity is extended to perforate 8 code positions, instead of the 5 code positions shown in the patent. There are accordingly no structural views of the perforator in the drawing of this application, but only the punch interposer magnets 232, which appear in the wiring diagram, Fig. 1*a*.

Figure 6:
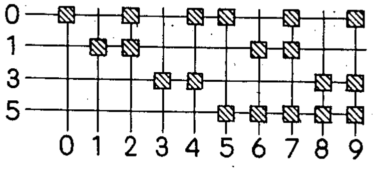
Fig. 6 is a diagram of the numerical code used in the illustrative example.

A portion of the tape used in the illustrative example is shown in Fig. 2. This is an 8 position tape with a row of feed holes 25 down the center. The lower 4 positions are used to represent the digits 0, 1 . . . 9 in accordance with the code shown in Fig. 6.

The information stored in the tape is divided into items, each consisting of a set of numbers, the first numbers in each set being used to identify the item number or class of the set and the following numbers representing the statistical information composing the item.

In the example, the indicative number is a 4 digit number, the four digits being respectively identified by perforations in the upper half of the tape. Perforation W identifies the thousands order digit, perforation X the hundreds order digit, perforation Y the tens order digit, and perforation Z the units order digit. In the fragment of tape shown the indicative number is 0010 and the following columns of the tape are perforated to represent the digits 50639. The number of columns following the indicative number of any set or item may vary at will and may be, for example, 75 columns, so that the whole set would be equivalent to the information on one standard 80 column card for controlling statistical machines.

In accordance with the invention the digits of the indicative number are sensed from the original tape in succession and are stored in storage means which controls one part of the comparing means. When the fourth digit has been stored a test is made to determine whether the number stored is one of the numbers set up in the storage device for comparison. In the present example an agreement causes the item to be re-perforated, including the indicative number. At the end of the run there has been produced a re-perforated tape containing a sequence of items, each of which is identified by an indicative number matching any one of the comparison numbers set up in the comparison device. In the circuit shown only four different comparison numbers can be set up, but this number can be increased in accordance with the possibilities of the number of digits used in the indicative number. For example, a practical comparison device might be capable of comparing the indicative numbers with 200 set up four digit numbers.

With the tape reader in operation, when the first column of perforations comes under the first row of pins 50 the W hole will allow the related contact 52 to be closed, setting up a circuit which is completed from the 40 volt source, through C3, to energize relay RW. C3 is closed from early in the cycle till a little after the middle of the cycle. The points 1—4 of RW close, setting up connections between the lower four pin contacts 52 and storage relays of the thousands order, R0TH to R5TH. Any of the four pin contacts last mentioned which is allowed to close by perforations in the tape aligned with the W hole will complete circuits to the related relays, which will be energized and will hold up through point 2 of relay R101, closed at this time. Relay R101 (Fig. 1*b*) is energized through point 5 of relay RW and holds up through a normally closed point 1 of relay RZ.

The tape will step to the next column, RW will drop out, and relay RX will be energized, closing its isolation contacts 1—4 connecting the hundreds order relays R0H to R5H to the lower four pin contacts 52. Combinational perforations in the digital part of the second column will selectively energize the relays of the hundreds order, which will also be held up through point 2 of relay R101.

In the same way the tens order and the units order digits will be stored as relays RY and RZ are energized, respectively.

When relay RZ is energized it sets up, through its point 2, a test circuit from the 150 volt source through cam contact C2 to the pick up coil P of the punch control relay R99. The remainder of this circuit is controlled by a number of vacuum tubes in parallel, 4 tubes, V1, V2, V3, and V4 being shown, as illustrative of a large number of tubes, for example, 200 tubes. These tubes are a part of the comparing means and if the indicative number agrees with any number set up in the comparing means the circuit will be completed through one of the tubes to the −15 volt point of the power supply and the punch control relay will be energized. The punch control relay holds up through its own contact R99–1 and a normally closed point 6 of RW. This point is now closed because the W column of the tape has passed and will not be energized until the next item begins to be sensed.

Figure 1A:
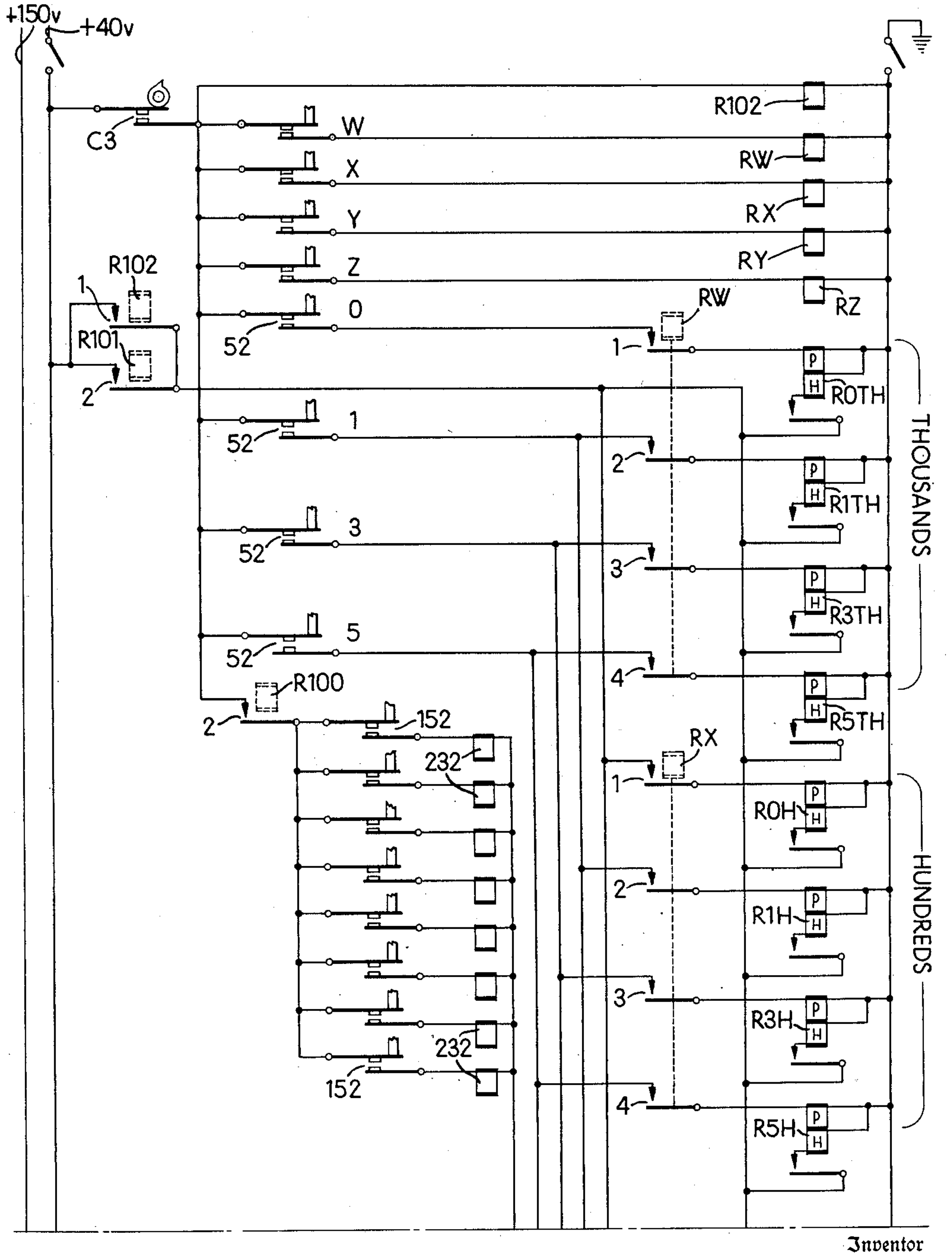
Figure 1B:
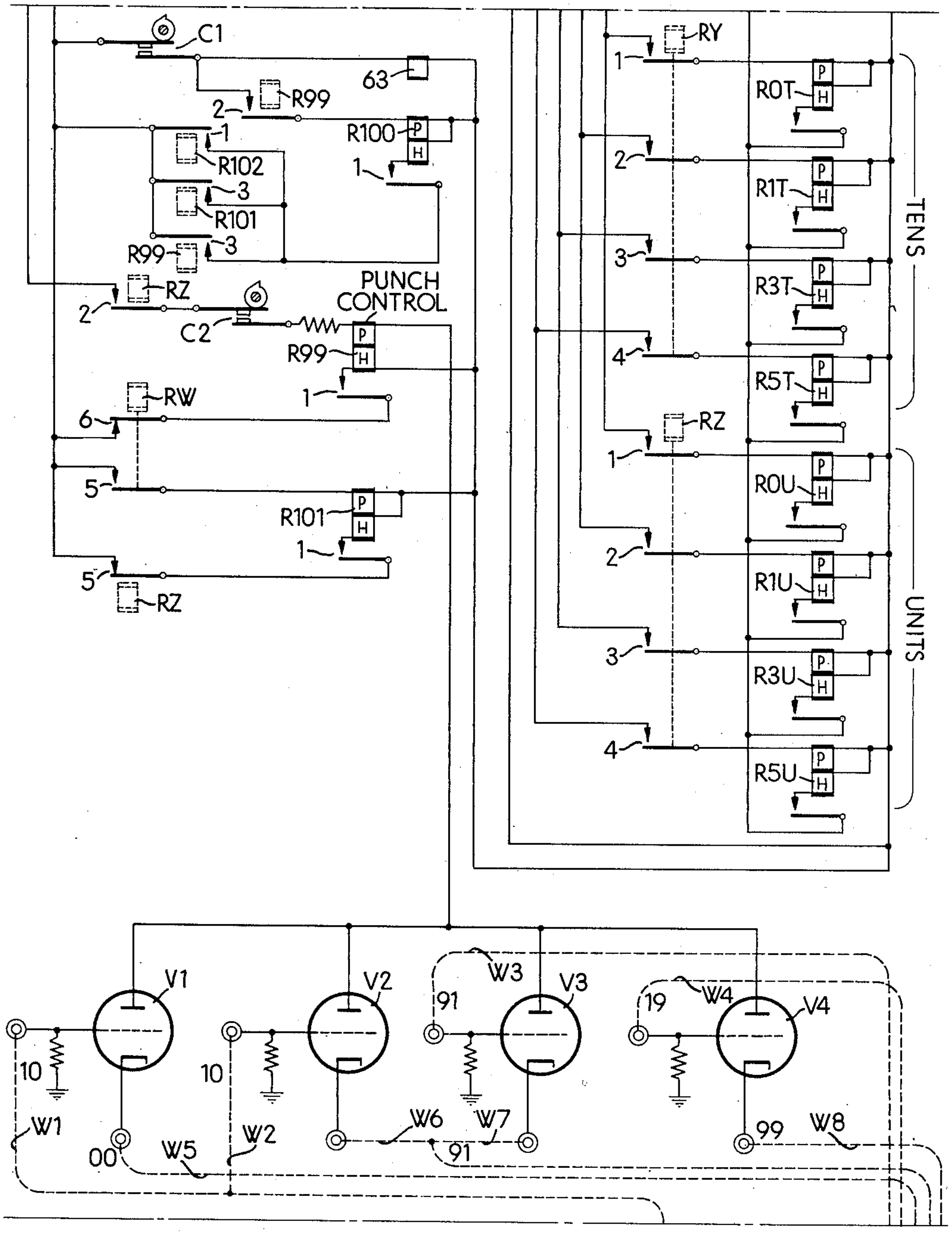

When RZ is energized its normally closed point 5 in the holding circuit of R101 opens, de-energizing this relay and allowing its normally open point in the holding circuit of the storage relays to open. The holding circuit of these relays is maintained through C3 time by the 1 point of relay R102 (Fig. 1*a*).

Point 2 of the punch control relay R99 prepares a circuit through which R100 is energized on the next closure of C1, which occurs near the end of the cycle, after C3 has opened. This relay holds up through its own point 1 and another point 3 of the punch control relay. Point 2 of relay R100 prepares a circuit through the pin contacts 152 to the punch interposer magnets 232, which will be selectively energized to reproduce the selected item of the tape, beginning with the first cycle of the tape reader following the sensing of the Z column by the first pins 50. At this time the W column will be under the second row of sensing pins 150 controlling the contacts 152.

The punch will continue to reproduce the original tape as long as relay R100 is energized. This relay remains energized through point 3 of the punch control relay R99 until the next W hole is sensed by the first set of reading pins, indicating the beginning of a new item. When this occurs point 6 of the relay RW opens and disables the holding circuit of the punch control relay, which drops out. However, at this time the relay R102 is energized and its point 1 maintains the holding circuit of R100 while C3 is closed. Also, during the same cycle R101 becomes energized through point 5 of RW and holds up through the normally closed point 5 of RZ. The 101 point 3 will therefore hold up relay R100 during the cycles when the W, X, Y, and Z columns of the second item are being sensed by the first set of sensing pins 50. Point 1 of R102 will maintain the circuit of R100 to the end of the sensing portion of the cycle in which the Z column is sensed by the first set of pins. R100 will then drop out and may remain de-energized during the next item, if the indicative number of item 2 does not match any comparison number set up.

Figure 1C:
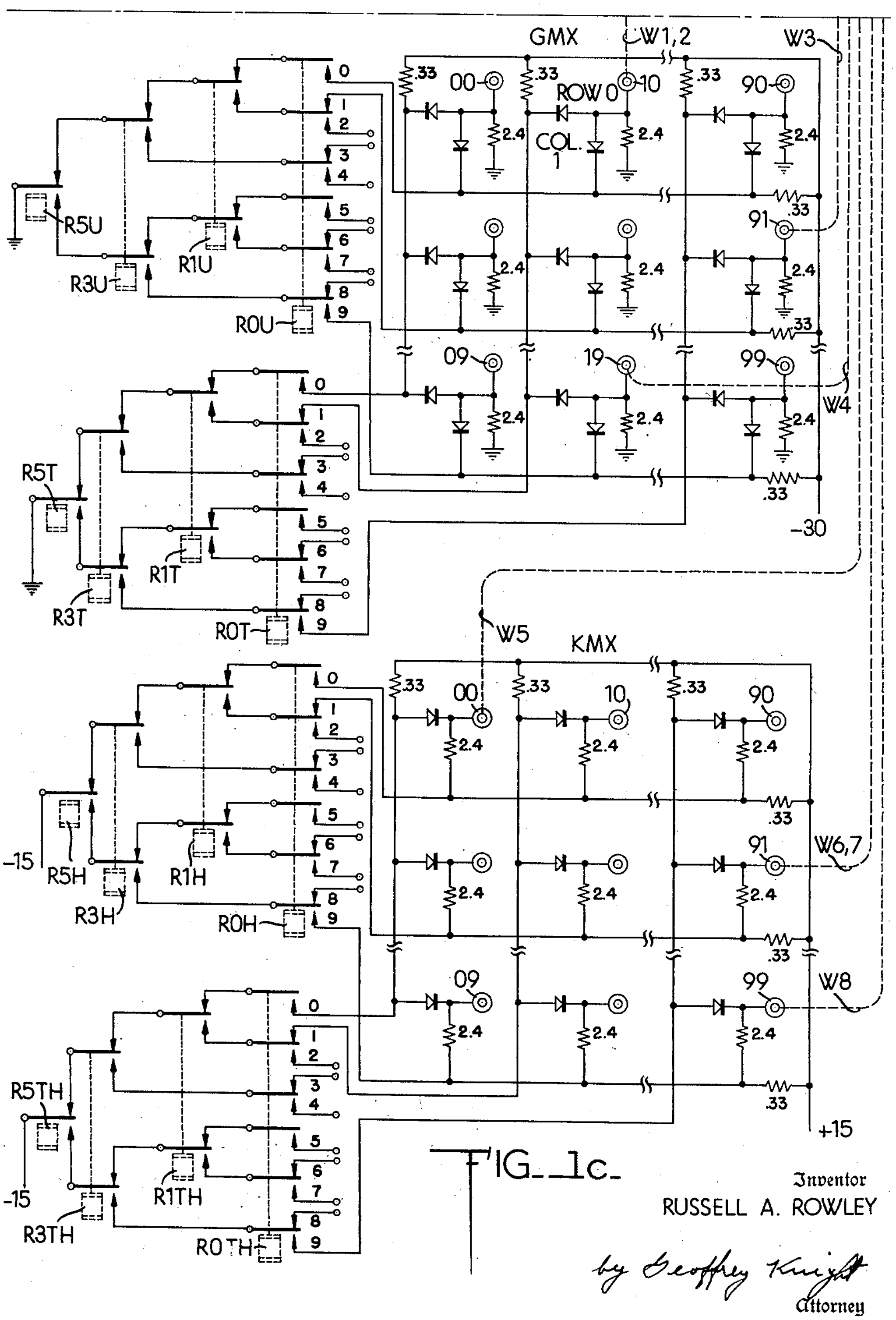

The tubes which control the circuit of the punch control relay R99 are under the influence of two matrix panels, namely, a grid matrix, GMX, and a cathode matrix, KMX, (Fig. 1c), each controlled by a different pair of the four groups of storage relays R0TH to R5U. The first matrix panel, GMX, has at the left, two Christmas tree circuits, the upper one being controlled by the units order storage relays R0U to R5U and the lower one by the tens order relays R0T to R5T. The apex of each Christmas tree is connected to ground. The exit wires of the units order group of relay points are connected to horizontal wires of the matrix panel having the respective values 0, 1, . . . 9, only the 0, 1, and 9 wires being shown. The exit wires of the lower Christmas tree are connected to vertical wires of the matrix panel, having the respective values 0, 1, . . . 9, only the 0, 1, and 9 wires being shown. The matrix panel is to be thought of as having ten rows and 10 columns each "intersection" having a related hub, such as 00 in the upper left-hand corner and 99 in the lower right-hand corner.

An "intersection" is a connection, including a group of impedances, between a vertical wire and a horizontal wire, there being one intersection for every possible pair of vertical and horizontal wires. Each hub is connected to an intermediate point in the related group of impedances and the matrix is connected to the voltage source, in a manner to be explained in detail presently, in such a way that a normal voltage established on all the hubs, is not significantly changed, at any hub, unless both the vertical wire and the horizontal wire associated therewith, are connected to ground through their Christmas tree circuits. Hence, when any horizontal wire and any vertical wire are connected to ground through the Christmas trees, only the hub at the intersection of those wires undergoes a significant change in voltage.

Each vertical wire and each horizontal wire is connected through a .33 kilo-ohm resistor to a −30 volt point of the power supply. The impedance group interconnecting the vertical and horizontal wires at each intersection consists of two rectifiers, the hub being connected between them and being also connected through a 2.4 kilo-ohm resistor to ground. The rectifiers have high impedance to current from the horizontal or vertical wires toward the hub and low impedance to current in the opposite direction.

The grid of any one of the vacuum tubes can be connected by plug wire to any one of the plug hubs of this matrix. For example, the grids of the first two vacuum tubes are both connected to the hub 10 by a split plug wire W1, W2. When the Christmas tree circuits are all open the voltage relations are such that the grids of the four tubes V1—V4 are at −30 volts.

Figure 4:
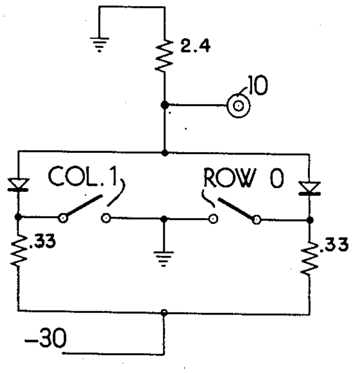
Figs. 4 and 5 are equivalent circuit diagrams of portions of the circuit.

This can be understood most readily by referring to the small view, Fig. 4, which may be thought of as an equivalent circuit of the circuit arms pertaining to the hub 10. The resistances are in thousands of ohms. Normally current flows from ground through the 2.4 resistor and, in parallel, through the two rectifiers in forward direction, thence through the .33 resistors to −30 volts. Most of the resistance in this voltage divider circuit is above the hub, therefore the voltage on the hub is close to −30.

If the col. 1 wire is connected to ground through the tens order Christmas tree circuit represented by closure of the left switch, there is little change in the voltage at the hub, because there is not enough increase in current through the right-hand .33 resistor by inverse flow through the left-hand rectifier to raise the voltage drop across the right-hand .33 resistor appreciably.

The result would have been the same if the row 0 wire had been connected to ground through the units order Christmas tree, since the two sides of the circuit are identical.

However, if both the col. 1 and row 0 wires are connected to ground the potential at the hub will rise to ground potential, because it has ground potential on both sides of it.

In short, the hub at the intersection of the column and row wires connected to ground is raised to ground potential and the other hubs will remain close to −30 volts.

The cathode of any tube V1–V4 can be connected by plug wire to any hub of the second matrix panel KMX. This is another 10 x 10 panel in which the row wires are controlled by the hundreds order storage relays R0H–R5H and the column wires by the thousands order storage relays R0TH–R5TH. The circuit arrangement and voltage supply in this panel are somewhat different from the one first described. The apex of each Christmas tree is connected to −15 volts and the horizontal and vertical wires are connected through .33 kilo-ohm resistors to +15 volts. The group of impedances interconnecting the horizontal and vertical wires at each intersection consists of a 2.4 kilo-ohm resistor and a rectifier, the hub being connected to their junction. The rectifier has low impedance to current from the vertical wire to the hub and high impedance to current in the reverse direction. Normally, when no circuit is completed in the Christmas trees the hubs will stand at +15 volts. This can be seen best from the small view, Fig. 5, which is an equivalent circuit of one hub position network.

Figure 5:
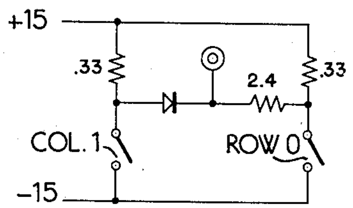

If the row zero contact is closed in the hundreds group of contacts, represented by the right-hand switch in Fig. 5, a voltage divider circuit is established through the left-hand .33 resistor, the rectifier in forward direction, and the 2.4 resistor. The combined resistance of the .33 resistor and the rectifier being only a small fraction of that of the 2.4 resistor, the voltage at the hub drops only slightly from +15 volts.

If the column 1 circuit is completed through the thousands order group of contacts, represented by the left-hand switch in Fig. 5, there being no circuit through the hundreds order group of contacts, this would be represented by closure of the left-hand switch in Fig. 5, with the right-hand switch open. A voltage divider circuit is established through the right-hand .33 resistor, the 2.4 resistor, and the rectifier in inverse direction. The inverse resistance of the rectifier being many times that of the sum of the .33 and 2.4 resistors, the hub again remains close to +15 volts.

If a circuit is closed through each of the hundreds and thousands groups of contacts, the hub at the intersection will drop to −15 volts, this being represented by the closure of both switches in Fig. 5. If the hub at the intersecting position should be the hub 00, the −15 volt condition would be transmitted through the plug wire W5 to the cathode of the tube V1. If the grid of this tube is at ground potential the tube will be in a conductive state and the test circuit through the punch control relay will be completed.

The circuit diagram shows the matrices set up by plug wires W1 to W8 for the following four digit numbers, starting with the left-hand tube V1:

0010
9110
9191
9919

A conditioning of the digit storage relays which activates any pair of hubs, one in each matrix, connected by plug wire to the same tube, will make that tube conductive and cause the punch control relay R99 to be energized.

The number of four digit numbers which can be set up as a comparison standard is limited by the number of tubes, such as V1–V4, and the number of these is limited only by the number of combinations possible with the two matrices. The capacity of the comparison device can be increased beyond the limits indicated in the circuit shown, by various means, such as increasing the number of characters in the notation system, with corresponding increase in the number of code positions and the number of horizontal and vertical exit wires of the storage relays. Also by using electronic tubes with a larger number of grids and controlling each grid by a separate matrix. It is also possible to filter the outputs of the vacuum tubes controlled by the first two matrices by other vacuum tubes controlled by additional matrices. The plates of the individual tubes can also be separately gated through an additional matrix, thereby increasing the number of characters in the comparison groups.

Since there is no conductive connection between the hubs of the two matrices the comparing device offers complete flexibility in plugging, without danger of spurious circuits.

The selective tape reproducer is shown merely by way of illustration and the comparison device may be used for any other purpose for which it is suitable.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a comparing device, a plurality of electronic tubes each having at least three electrodes, a source of voltage, means to provide a common connection between one point of said voltage source and a first electrode of each of said tubes, said connection including an agreement indicating device adapted to be operated by current passing through said connection and any one of said tubes, at least two matrices each comprising a plurality of plug hubs, a changeable plugwire connection between the second electrode of each tube and a selected plug hub of one of said matrices, a changeable plugwire connection between the third electrode of each tube and a selected plug hub of the other one of said matrices, normal connections between said voltage source and the plug hubs of one of said matrices adapted to establish a normal voltage at said plug hubs, normal connections between said voltage source and the plug hubs of the other one of said matrices adapted to establish a normal voltage on the latter plug hubs, said normal voltages being such that the tubes whose second and third electrodes are connected to said plug hubs are non-conductive, means for selectively shifting the voltage on any one of the hubs of said first matrix in a positive direction, means for selectively shifting the voltage on any one of the hubs of said second matrix in a negative direction, the combined shifts in opposite directions, when applied to electrodes of a single tube, being sufficient to render the tube conductive and operate said agreement device, but the shifts individually being insufficient to render a tube conductive.

2. A comparing device as described in claim 1, wherein each of said matrices comprises an array of horizontal and vertical wires interconnected in pairs by groups of impedances whose intermediate junctions are connected to respective plug hubs, said wires being resistively connected to the voltage source to establish the normal voltages on said hubs, and means for selectively connecting one of the horizontal wires and one of the vertical wires of each matrix to the voltage source to shift the voltage on one hub of each matrix in the manner stated in claim 1.

3. A comparing device as described in claim 2, wherein each of said groups of impedances of the matrix whose hubs undergo a positive shift from the normal voltage comprises two rectifiers having high impedance to current from said wires to the appurtenant hub and low impedance to current in the reverse direction, the point of the voltage source to which the wires of said matrix are resistively connected being at a lower voltage than the point of the voltage source to which the wires are selectively connected and the appurtenant hubs being resistively connected to said latter point of the voltage source.

4. A comparing device as described in claim 2, wherein each of said groups of impedances of the matrix whose hubs undergo a negative shift from the normal voltage comprises a rectifier and a resistor, the rectifier having a high impedance to current from the hub to the wire but low impedance to current in the reverse direction, the point of the voltage source to which the wires of said matrix are resistively connected being at a higher voltage than the point to which said wires are selectively connected.

RUSSELL A. ROWLEY.

No references cited.